United States Patent [19]
Molnar

[11] Patent Number: 5,518,529
[45] Date of Patent: May 21, 1996

[54] METHOD AND DEVICE FOR ASH DISCHARGE

[75] Inventor: Antal Molnar, Finspong, Sweden

[73] Assignee: ABB Carbon AB, Finspong, Sweden

[21] Appl. No.: 402,985

[22] PCT Filed: Apr. 7, 1992

[86] PCT No.: JE92/00224

§ 371 Date: Oct. 12, 1993

§ 102(e) Date: Oct. 12, 1993

[87] PCT Pub. No.: WO92/18811

PCT Pub. Date: Oct. 29, 1992

Related U.S. Application Data

[63] Continuation of Ser. No. 133,111, Oct. 12, 1993, abandoned.

[30] Foreign Application Priority Data

Apr. 12, 1991 [SE] Sweden ................................. 9101132

[51] Int. Cl.⁶ .................................................. B65G 51/00
[52] U.S. Cl. ................... 95/271; 55/431; 55/466; 55/DIG. 32; 406/121; 406/143; 406/173
[58] Field of Search ............................. 55/423, 431, 447, 55/466, DIG. 32; 95/271, 273, 279; 406/121, 141, 142, 143, 173

[56] References Cited

U.S. PATENT DOCUMENTS

| | | | |
|---|---|---|---|
| 1,353,431 | 9/1920 | Sims | 55/431 |
| 2,409,211 | 10/1946 | Kalle | 55/431 |
| 2,661,244 | 12/1953 | Baily | 406/143 |
| 2,784,803 | 3/1957 | Saxton | 55/466 |
| 4,120,675 | 10/1978 | Boyles et al. | 55/431 |
| 4,669,210 | 10/1987 | Brannstrom . | |
| 4,747,852 | 5/1988 | Engstrom . | |

FOREIGN PATENT DOCUMENTS

| | | | |
|---|---|---|---|
| 0260677 | 1/1964 | Australia | 406/143 |
| 0108505 | 5/1984 | European Pat. Off. . | |
| 1121543 | 1/1962 | Germany | 406/143 |
| 3-46926 | 2/1991 | Japan | 406/143 |
| 1437320 | 11/1988 | U.S.S.R. | 406/143 |
| 0006665 | of 1891 | United Kingdom | 55/423 |
| 86/03986 | 7/1986 | WIPO . | |

Primary Examiner—C. Scott Bushey
Attorney, Agent, or Firm—Pollock, Vande Sande & Priddy

[57] ABSTRACT

A method of feeding out dust in a dust discharge system in a power plant including feeding out dust pneumatically from a separator via a suction nozzle by using transport gas with a pressure exceeding atmospheric pressure, supplying diluting gas into the transport gas at a location close to the suction nozzle of the dust discharge system, and selecting the flow of diluting gas into the transport gas so that part of the pressure drop ($\Delta P_{gas}$) of the transport gas across the dust discharge system ($\Delta p$) is maintained.

5 Claims, 2 Drawing Sheets

5,518,529

METHOD AND DEVICE FOR ASH DISCHARGE

This application is a continuation of Ser. No. 08/133,111 filed on Oct. 12, 1993, now abandoned.

FIELD OF THE INVENTION

The present invention relates to a method and a device for reducing the risk of clogging of ash discharge systems in power plants. It relates above all to the discharge of ashes from flue gas cleaners, so-called cyclones, in connection with separation of particulate material from combustion gases in power plants with combustion in fluidized beds. The invention relates primarily to combustion in pressurized beds in so-called PFBC power plants but is also applicable to other plants dealing with similar problems.

BACKGROUND OF THE INVENTION

During separation of particulate material in a cyclone, separated material falls down onto the cyclone bottom or onto the bottom of a cyclone leg below the actual cyclone. From the cyclone bottom or the cyclone leg the separated material is passed to an ash discharge system. The ash discharge system may at the same time comprise a pressure reducing system, which belongs to the prior art in a PFBC power plant according to, for example, the European Published patent application 108 505. The pressure reducing system reduces the gas pressure prevailing in the cyclone to a suitable pressure level, usually close to atmospheric pressure. The combustion gases cleaned in the cyclone are passed out at the upper part of the cyclone. A small part of these combustion gases, however, is utilized as transport gas for feeding the separated material out to and through the ash discharge system. Since in a PFBC power plant the pressure difference between the pressure in the interior of the cyclone and the atmospheric pressure is great, this pressure difference is under normal conditions sufficient for discharging separated material. The above-mentioned patent specification discloses a suction nozzle for ash discharge located near the bottom of a cyclone leg, the suction nozzle including a vertical riser with an opening at the top. Close to its top part, the suction nozzle is provided with a horizontal branch pipe which communicates with the ash discharge system. The lower opening of the suction nozzle is located somewhat above the bottom of the cyclone leg in order for a layer of separated dust, formed on this bottom, to serve as erosion protection for the bottom material of the cyclone leg. Material separated in the cyclone falls down against this bottom layer of dust and is sucked out through the suction nozzle.

The dust discharge capacity in an ash discharge system according to the above is related to the described pressure difference between the pressure which prevails in the cyclone and the pressure at the outlet from the ash discharge system. The pressure in the cyclone is substantially the same as the pressure in the bed vessel, which in turn is almost the same as the pressure in the pressure vessel in which the bed vessel is enclosed in a PFBC power plant. It can thus be said that the quantity of dust which can be fed out per unit of time depends on the pressure difference between the pressure in the cyclone and the pressure at the outlet of the ash discharge system. This in turn means that the capacity for the amount of fed-out dust depends on the pressure in the pressure vessel being maintained and that this pressure, after a certain reduction down to the lower part of the cyclone, has the possibility of acting up to the suction nozzle for the ash discharge system.

Under certain conditions or operating conditions in a power plant, it has been found that an ash discharge of the kind described above does not function as intended. The problem which usually arises is that plugs of dust clog the ash discharge system, which leads to shutdown and an immediate need of service in a power plant of the kind outlined here.

For discussion about the reasons for malfunction of the ash discharge system of a PFBC power plant, certain operating principles of such a plant will first be described.

The bed in a PFBC power plant is fluidized by means of pressure vessel air, which is compressed in a compressor. This compressor is driven by a gas turbine, which in turn receives its energy during expansion of the combustion gases which leave the cyclones after dust separation.

Particulate fuel to the bed, usually in the form of both a finer and a coarser fraction, is supplied to a bed material in the bed via supply nozzles. Upon start-up of the plant, the bed material is first heated to working temperature by means of a separate burner, whereupon the fuel in the bed is fired in fluidized state.

When a need for a load change arises, bed material is fed out into a storage, from where bed material may be fed back to the bed when a load increase is desirable.

A load increase of the power plant may be achieved by increasing the bed height by feeding in more bed material.

A risk of malfunction of the dust discharge arises, among other things in the following cases drop out of pressure in the pressure vessel, supply of a start-up bed, a load increase, and at the beginning of the firing, when the fuel in the bed is ignited.

A drop out of pressure vessel air may be caused by a gas turbine trip in connection with some malfunction thereof.

Some time after a gas turbine trip, the bed is fluidized. This causes a larger than normal amount of dust to be released from the bed surface for a brief period of time. A larger than normal amount of dust per unit of time is released from the bed surface also when feeding in a starting bed, in case of load increase, as well as at the beginning of the firing in the fluidized bed. This larger than normal dust quantity is to be separated by the cyclones in a short period, which may mean that the maximum dust discharge capacity may be exceeded. Dust is then collected at the bottom of the cyclone leg, the height of the dust layer located in the bottom of the cyclone leg thus increasing. This dust layer may be increased relatively far above the opening of the suction nozzle. A pressure drop for the transport gas which is forced to penetrate the dust layer before the gas reaches the suction nozzle may be recorded. Because the suction nozzle is now immersed in dust, a larger than normal proportion of dust will be fed into the dust discharge system. When the maximum dust discharge capacity is exceeded in this way, a plug may occur in the ash discharge system.

At the inlet of the dust discharge system a gas pressure prevails with the amount $\Delta p_s$ exceeding the atmospheric pressure. Between the suction point for the dust and the termination of the discharge system at atmospheric pressure, a pressure drop $\Delta p_s$ consequently exists. When transporting dust through the system, this pressure drop may be divided into two components $\Delta p_{gas}$ and $\Delta p_{dust}$, where $\Delta p_{gas}$ constitutes the pressure drop in gas only and $\Delta p_{dust}$ constitutes the pressure drop caused by the presence of dust in the system. From this follows that $$\Delta p_s = \Delta p_{gas} + \Delta p_{dust}$$

If the proportion of dust in the dust discharge system increases, $\Delta p_{gas}$ thus decreases, which entails a reduced gas flow. This reduced gas flow is then not sufficient for transporting the larger proportion of dust present in the system, which may lead to clogging of the dust discharge system and a plug may be formed. Consequently, it is important to ensure that the quantity of dust fed into the system does not become too large, so that a pressure drop across the system allows free scope for a sufficiently large quantity of transport gas.

To prevent too large a quantity of dust from being injected into the system in relation to the quantity of dust, the proportion of dust may be diluted when there is a risk of a dust surplus. Transport gas must thus be available in sufficient quantity on each occasion. For example, a suction nozzle of a previously known and used kind, embedded in dust, blocks the supply of transport gas to the nozzle. The above-mentioned pressure $\Delta p_s$ causes dust to be pressed into the discharge system, which then receives too large a value of the pressure drop $\Delta p_{dust}$, resulting in $\Delta p_{gas}$ decreasing with clogging of the system as a possible consequence. In the above-mentioned patent application, a proposal for injection of air by means of an ejector nozzle is disclosed. With such a device, however, there is a risk of too large a quantity of dust being injected into the discharge system under the critical operating conditions described above.

SUMMARY OF THE INVENTION

The present invention comprises a device in the form of an additional air nozzle for the supply of diluting air located close to a suction device for feeding out dust in a dust discharge system where dust is fed out with a transport gas and is intended to dilute dust-rich gas which originates from, for example, a gas cleaner in a power plant. The diluting air is injected towards the suction device with such an adapted gas flow that the transport gas for the dust through the dust discharge system under any conceivable operating condition of the plant is at least given the minimum transport gas flow required by the system.

The air nozzle in the present invention supplies the system with transport gas even if the dust quantity has become so large that the suction nozzle of the dust discharge system is completely or partially embedded in dust.

If the air nozzle delivers a larger air quantity than what the discharge system is able to receive as transport gas, excess air will blow back out from the orifice of the suction nozzle, thus preventing dust from being sucked into the system. In this way, a regulation of the the fed-in dust per unit of time is obtained.

When the delivered air quantity of the air nozzle, the distance of the air nozzle from the orifice of the suction nozzle, and the shape of the air nozzle in relation to the capacity of the dust discharge system and the pressure drop across the system are correctly dimensioned, a state of equilibrium may be attained where clogging of the system is prevented by a comfortable margin when discharge of dust takes place.

The air to the air nozzle may be obtained from different sources. If an external pressure source with a controllable pressure independent of the pressure in the pressure vessel (if any) of the power plant is utilized, the possibilites are increased of obtaining a dust discharge also in the event of functional disorders or changes of the operation which have been described above as causing the risks of the formation of dust plugs. The air in a pressure vessel or in a cyclone may, alternatively, be used for the above-mentioned dilution of dust through a direct conduit from a pressure vessel or from the cyclone. The disadvantage of utilizing this readily available air is that, under certain of the above-mentioned disturbing conditions, it is also pressureless or has reduced pressure.

DESCRIPTION OF THE PREFERRED EMBODIMENTS

A number of embodiments of a device according to the invention will be described with reference to the accompanying figures.

Figure 1:
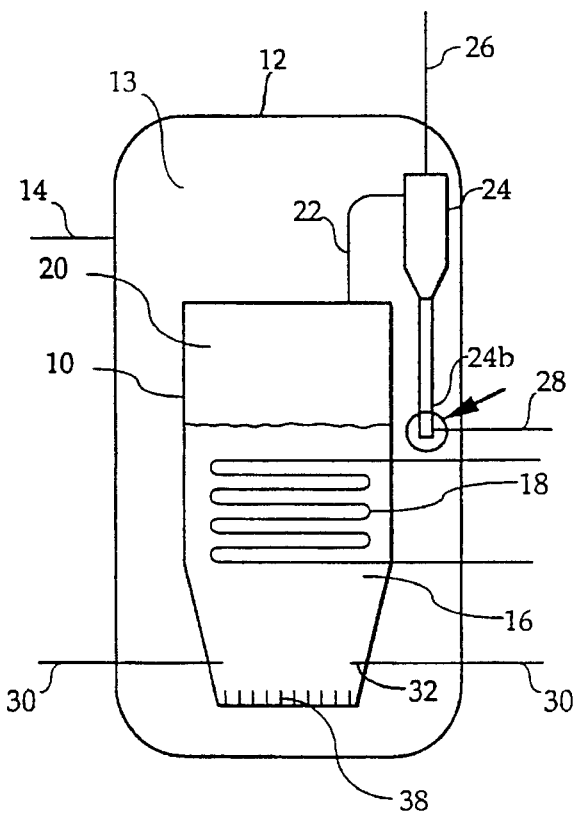
FIG. 1 shows a simplified diagram of the principle of operation of a PFBC power plant with the region of action of the present invention encircled.

FIG. 1 schematically shows a combustor of a PFBC power plant, where combustion takes place at a pressure considerably exceeding the atmospheric pressure. In the figure a combustor 10 is placed inside a pressure vessel 12. The space 13 is supplied with compressed combustion air from a compressor (not shown) through the conduit 14. The combustor 10 contains a fluidizable bed of particulate material 16, in which a fuel is burnt. The combustor 10 also comprises tubes 18 for generating steam for a steam turbine (not shown) and for cooling the bed 16. Combustion gases leaving the bed 16 are collected in the freeboard 20, are passed through the conduit 22 to a cleaning plant 24, symbolized by a cyclone 24, where dust is separated and falls down into a cyclone leg 24b, and are passed on from the cyclone through a conduit 26 to a gas turbine (not shown). Separated dust is discharged from the cyclone 24 through the conduit 28 to an ash discharge and pressure reducing system (not shown). Fuel is fed into the combustor 10 through the conduit 30 and through nozzles 32. The combustor 10 is supplied with air from the space 13 through nozzles 38 for fluidization of the material in the bed 16 and combustion of the supplied fuel.

Figure 2:
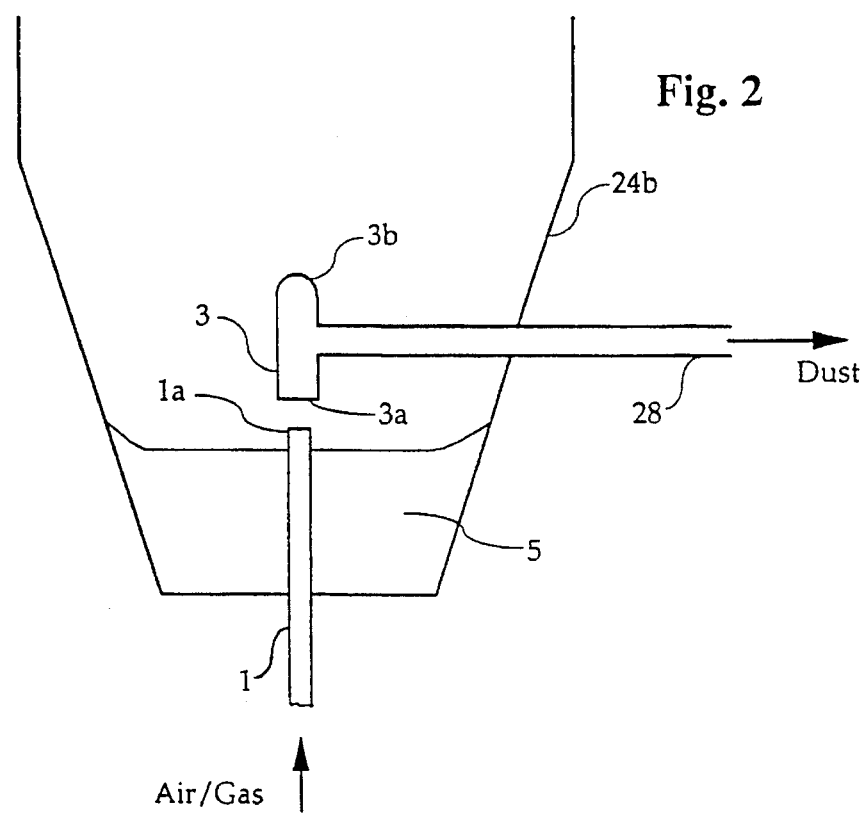
FIG. 2 illustrates a sectional view of a nozzle for additional air in a suction nozzle for a dust discharge system at the bottom of a cyclone.

A preferred embodiment of the invention is shown in FIG. 2. In the present lower part of a cyclone leg 24b, a suction nozzle 3 is arranged. The suction nozzle 3 forwards transport gas and dust through the discharge conduit 28 to an ash discharge system. The nozzle 3 has a downward opening 3a and is equipped with a blind space 3b. The dust separated by the cyclone falls to the bottom of the cyclone 24 or the cyclone leg 24b, this dust forming a dust layer 5. As previously mentioned, under certain conditions the dust layer 5 may be built up so far as up to the orifice 3a of the suction nozzle 3 or higher, the nozzle 3 thus being embedded in dust. In such a position, too large a proportion of dust in relation to transport gas will be fed into the dust discharge system. To eliminate this problem, an outlet 1a is mounted close to the orifice 3a of the suction nozzle 3 for the supply of diluting gas to this orifice 3a. In one embodiment, the outlet 1a is connected to a pipe 1 for the supply of diluting gas to the nozzle 3. The outlet 1a is directed straight towards the orifice 3a of the suction nozzle 3 and located at a balanced distance from the orifice 3a. The outlet 1a may also be inserted into the nozzle 3. The diluting gas supplied through the pipe 1 is preferably delivered from a pressure source which is independent of the transport gas in the cyclone. When supplying gas from an independent source, the advantage is also obtained that the added type of gas may be selected freely. As an alternative, however, also pressure vessel air from the pressure vessel 12 may be utilized. It is of importance that the gas flow from the outlet 1a is adapted to the transport gas requirement of the ash discharge system. As an example, an ejector nozzle for injecting gas at a high velocity into the nozzle 3 cannot be employed as outlet 1a, since this would entail a risk of feeding too large a quantity of ash into the ash discharge system. The outlet 3a may be formed in many different ways, for example as a straight pipe termination according to FIG. 2. The distance between outlet 1a and nozzle 3 must be tested. If this distance becomes too small, there is a risk that the injection of diluting gas will prevent inflow of ashes to the suction nozzle 3.

The correct flow of the diluting gas must be tested to adapt to the capacity and requirement of the dust discharge system.

Figure 2A:
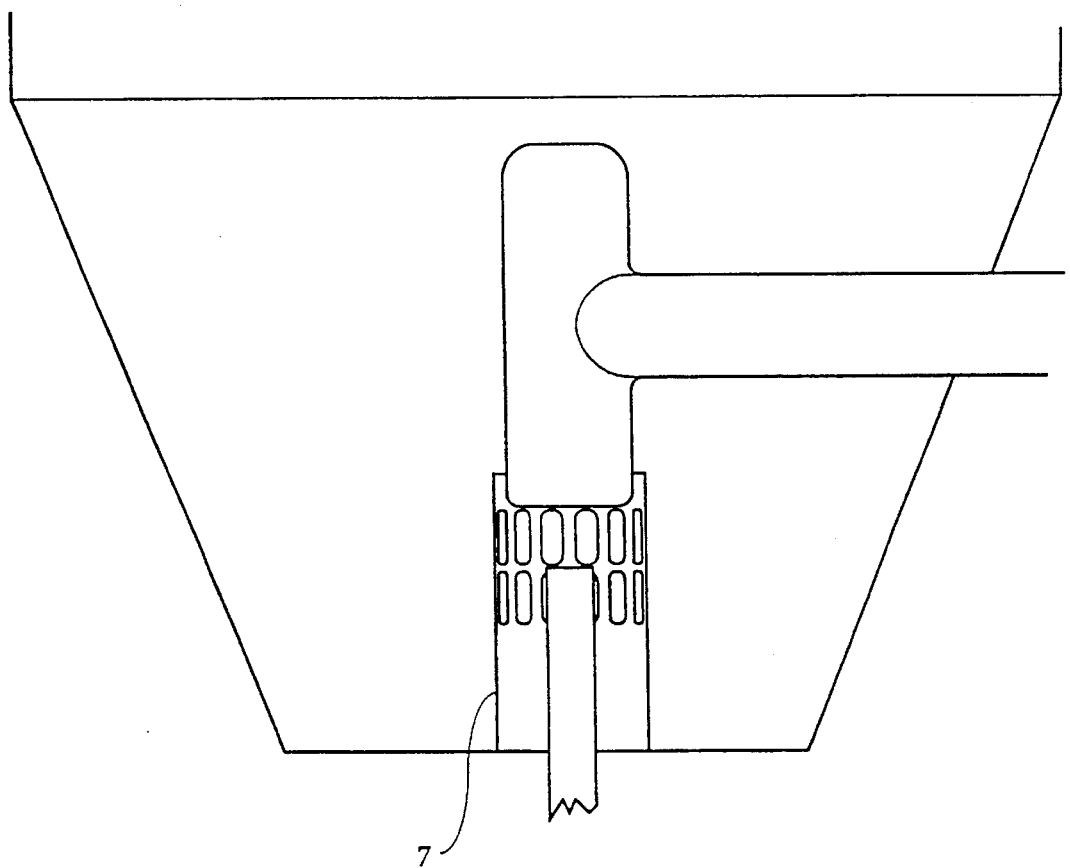
FIG. 2a illustrates a strainer means between the nozzle for additional air and the suction nozzle to a dust discharge system.

To reduce the risk of plugging up, the embodiment of the invention according to FIG. 2 may be supplemented by a strainer means 7 as shown in FIG. 2a. This prevents flakes, lumps or the like from plugging up the gap between the outlet 1a and the orifice 3a.

I claim:

1. A method of feeding out dust in a dust discharge system in a power plant comprising the steps of:

feeding out dust pneumatically from a separator via a suction nozzle by means of transport gas with a pressure exceeding atmospheric pressure;

supplying diluting gas into the transport gas at a location close to the suction nozzle from a pipe outlet normally extending above dust level at a distance from the orifice of the suction nozzle, said distance being determined with respect to the capacity of the dust discharge system and the pressure drop across the system; and selecting the flow of diluting gas into the transport gas such that the pressure drop of the transport gas part ($\Delta Pgas$) the total pressure drop across the dust discharge system ($\Delta p$) is maintained under all operating conditions.

2. A method of feeding out dust according to claim 1 in the power plant comprising a combustor enclosed within a pressure vessel, wherein the diluting gas consists of gas supplied from one of the dust separator and the pressure vessel.

3. A method of feeding out dust according to claim 1 wherein the diluting gas is supplied from a separate external pressure source to ensure that the transport gas will have at least the minimum pressure required by the dust discharge system under all operating conditions.

4. A device for feeding out dust according to claim 1, wherein the region between said pipe outlet and said orifice of the suction nozzle is surrounded by a strainer means.

5. A device for feeding out dust in a power plant where dust is fed out pneumatically from a dust separator via a suction nozzle by means of a transport gas with a pressure exceeding the atmospheric pressure, the device including: a means for supplying diluting gas to the orifice of the suction nozzle, said diluting gas supplying means including a pipe outlet being located at a close distance to the orifice so that the diluting gas from the pipe outlet is injected straight into the transport gas in the suction nozzle in the quantity necessary to maintain at least the minimum required transport gas flow under all operating conditions, and wherein said pipe outlet extends above dust level during normal operating conditions and said distance from the orifice is determined with respect to the capacity of the dust discharge system and the pressure drop across the system.

\* \* \* \* \*

UNITED STATES PATENT AND TRADEMARK OFFICE
CERTIFICATE OF CORRECTION

PATENT NO. : 5,518,529
DATED : May 21, 1996
INVENTOR(S) : Antal Molnar

It is certified that error appears in the above-identified patent and that said Letters Patent is hereby corrected as shown below:

Item [86]
On the title page, change "PCT No.: JE92/00224" to
-- PCT No.: SE92/00224 --.

Signed and Sealed this

Twenty-fourth Day of September, 1996

Attest:

BRUCE LEHMAN

Attesting Officer        Commissioner of Patents and Trademarks